(12) United States Patent
Xiang

(10) Patent No.: US 7,813,294 B2
(45) Date of Patent: Oct. 12, 2010

(54) METHOD, APPARATUS AND SYSTEM FOR IMPLEMENTING IUUP/NBUP PROCEDURE CONTROL

(75) Inventor: Fei Xiang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 834 days.

(21) Appl. No.: 11/640,719

(22) Filed: Dec. 18, 2006

(65) Prior Publication Data

US 2007/0153686 A1 Jul. 5, 2007

(30) Foreign Application Priority Data

Dec. 19, 2005 (CN) .................... 2005 1 0121003

(51) Int. Cl.
*H04J 1/16* (2006.01)
(52) U.S. Cl. .................. 370/252; 370/241; 370/233; 370/230; 455/450; 455/522; 455/452.1
(58) Field of Classification Search .......... 370/229, 370/252, 282, 329, 386, 395, 403, 312, 335, 370/402; 455/69, 127.1, 503, 517, 518, 520, 455/521, 522; 375/144, 347
See application file for complete search history.

(56) References Cited

U.S. PATENT DOCUMENTS

| 2002/0085511 | A1* | 7/2002 | Koponen et al. ............ 370/315 |
| 2003/0026248 | A1* | 2/2003 | Hiroki ..................... 370/352 |
| 2003/0076793 | A1* | 4/2003 | Gao ........................ 370/329 |
| 2003/0103470 | A1* | 6/2003 | Yafuso .................... 370/282 |
| 2003/0122667 | A1* | 7/2003 | Flynn ...................... 340/540 |
| 2003/0128686 | A1  | 7/2003 | Hur |
| 2003/0147371 | A1* | 8/2003 | Choi et al. ................ 370/341 |

(Continued)

FOREIGN PATENT DOCUMENTS

CN 1304589 7/2001

(Continued)

OTHER PUBLICATIONS

"Universal Mobile Telecommunications System (UMTS)"; ETSI Standards, European Telecommunications Standards Institute, Sophia-Antipo, FR, vol. 3-R3, No. V620, Mar. 2005, XP014027686.

*Primary Examiner*—Pankaj Kumar
*Assistant Examiner*—Anez Ebrahim
(74) *Attorney, Agent, or Firm*—Finnegan, Henderson, Farabow, Garrett & Dunner LLP

(57) ABSTRACT

The present invention relates to the field of mobile communication, including method, apparatus and system for implementing IuUp/NBUP procedure control. The method includes parsing a received UP frame; generating a control message based on a value obtained from the parsing, and buffering the control message; executing the buffered control message. When multiple time alignment or rate control messages are received, the dropping or suspending of the later received messages due to the execution of a control message may be avoided; by way of setting the state of the message and adding a message identification, the successive rate adjustment procedure may be optimized. The method according to an embodiment of the present invention is capable of originating a rate or time adjustment initiatively. The present invention also discloses an apparatus and system for implementing IuUp/NBUP procedure control, with a good good extensibility, which improves the response efficiency of the system.

24 Claims, 6 Drawing Sheets

U.S. PATENT DOCUMENTS

| | | | |
|---|---|---|---|
| 2003/0203716 A1* | 10/2003 | Takahashi et al. | 455/11.1 |
| 2004/0014452 A1* | 1/2004 | Lim et al. | 455/403 |
| 2005/0013312 A1* | 1/2005 | Karlsen et al. | 370/412 |
| 2005/0041670 A1* | 2/2005 | Lin et al. | 370/395.21 |
| 2005/0122435 A1* | 6/2005 | Yunoki | 348/725 |
| 2005/0276249 A1* | 12/2005 | Damnjanovic et al. | 370/335 |
| 2006/0018277 A1* | 1/2006 | Petrovic et al. | 370/329 |
| 2006/0114936 A1* | 6/2006 | Paffen | 370/469 |
| 2006/0230109 A1* | 10/2006 | Lee et al. | 709/205 |

FOREIGN PATENT DOCUMENTS

| | | |
|---|---|---|
| CN | 1545233 | 11/2004 |
| KR | 20030058029 | 7/2003 |
| WO | WO01/91489 | 11/2001 |
| WO | WO02/054658 | 7/2002 |

* cited by examiner

METHOD, APPARATUS AND SYSTEM FOR IMPLEMENTING IUUP/NBUP PROCEDURE CONTROL

FIELD OF THE INVENTION

The present invention relates to the field of mobile communication, and more particularly, the present invention relates to a method for implementing procedure control of Iu Interface (an interface between a Radio Access Network and a Core Network)/Nb Interface (an interface between Media Gateways) User Plane protocol (abbreviated as IuUP/NbUP protocol).

BACKGROUND OF THE INVENTION

In a 3G mobile communication system, the software entity of UP (User Plane, a plane for transmitting user data) protocol generally exists in an MGM (Media Gateway), an RNC (Radio Network Controller) of UTRAN (UMTS Terrestrial Radio Access Network). The Iu Interface is an interface between a Radio Access Network and a Core Network, and the Nb Interface is an interface between Media Gateways. The two objects of IuUP/NbUP protocol includes: (1) transmitting UP data, guaranteeing the QoS (Quality of Service) of UP data transmission through the UP control signaling (UP initialization, rate control, time alignment and error event Indicator); (2) keeping the independence of the CN (Core Network), thus reducing the dependence of the CN on the Transfer Network Layer (TNL), e.g. RTP/UDP/IP, as far as possible.

An existing technical solution of IuUP/NbUP procedure control is shown in FIG. 1. An UP frame checking and distributing module 101 checks the UP frame number, performs CRC (Cyclic Redundancy Check) for the UP frames received by the system, and differentiates the data frames and the control frames depending on the PDUType (Pritocol data unit type) in the UP frame header. At present, only an SMpSDU (Support mode for predefined SDU size, SMpSDU) support mode is defined in the UP protocols of 3G standard (3GPP TS 25.415, 3GPP TS 29.415). Under the SMpSDU support mode, the PDUType value of a data frame is 0 or 1, while the PDUType value of a control frame is 14. The UP frame checking and distributing module 101 determines whether a received UP frame is a control frame or a data frame according to the PDUType value of this UP frame. If it is a control frame, the UP frame checking and distributing module 101 transmits it to an UP request-frame distributing/response-frame packaging and transmitting module 102, and if it is a data frame, the UP frame checking and distributing module 101 transmits it to a data frame processing module 108.

On receiving the control frame, the UP request-frame distributing/response-frame packaging and transmitting module 102 determines the type of the control frame depending on the Procedure Indicator in the frame header, and distributes the control frame to the corresponding procedure control module according to the type of the control frame. The procedure control module may be an UP initialization processing module 103, an UP time alignment processing module 104, an UP rate control processing module 105 and an UP error event processing module 106. The processing procedure of each module will be described hereinafter. On receiving the control frame, if the UP request-frame distributing/response-frame packaging and transmitting module 102 determines the control frame is an initialization frame, the UP request-frame distributing/response-frame packaging and transmitting module 102 transmits it to the UP initialization processing module 103. If the control frame is determined to be a rate control request frame, the UP request-frame distributing/response-frame packaging and transmitting module 102 transmits it to the UP rate control processing module 105. If the control frame is determined to be a time alignment request frame, the UP request-frame distributing/response-frame packaging and transmitting module 102 transmits it to the UP time alignment processing module 104. The processing procedure of the modules will be described below.

On receiving the initialization frame, the UP initialization processing module 103 extracts a set of RFCIs (RFCI: Radio Access Bearer Sub-flow Combination Indicators) supported by the sender and the length of the bearer sub-flow service data unit (SDU) corresponding to each set of RFCIs. Thereafter, according to the set of RFCIs, the data stream processing entity will be controlled to transmit and receive the UP data streams.

On receiving the rate control request frame of a control originator, the UP rate control processing module 105 extracts the maximal rate demanded by the control originator, and then transmits the rate control message to the TC encoding/decoding channel, indicating the TC encoding/decoding channel to adjust the transmitting rate of the data frame to a predefined value. After a successful rate adjustment, the UP rate control processing module transmits a response frame to the control originator.

On receiving the time alignment request frame from the control originator, the UP time alignment processing module 104 extracts the time alignment value, and then transmits a time control message to the TC encoding/decoding channel, indicating the TC encoding/decoding channel to advance or postpone the transmitting time of the data frame by the predefined value. After a successful time alignment, the UP time alignment processing module transmits a response frame to the control originator.

When an error is found in the procedure for processing the data frame or the control frame, the UP error event processing module 108 will be informed. Upon the determination of the type of the error, the UP error event processing module 108 transmits an error event frame to the entity of the opposite end. As for the error event frame transmitted from the opposite end, the local end will record the event and inform the data-stream processing function entity to handle accordingly.

It can be seen from the above described technical solution of IUUP/NBUP procedure control that, during the procedure control, the operation of the execution entity of procedure control function, i.e. the TC encoding/decoding channel 107, by the processing modules is asynchronous and monopolized. That is, the next operation request can not be executed before the previous operation request is ended. For example, on receiving a rate control request frame, the UP rate control processing module 105 transmits a rate control message to the TC encoding/decoding channel 107, and the system also receives a time alignment request frame before the TC encoding/decoding channel 107 returns a response. Then the latter time alignment request will be suspended for the TC encoding/decoding channel 107 is processing the previous rate control request. According to the UP protocol of 3G standard (3GPP TS 25.415), in an UP support mode session, UP initialization is the first UP procedure control function, after which, the UP rate control processing module, the UP time alignment processing module and the UP error event processing module are all independent from each other, and cannot be restricted by each other when implementing the procedure control function.

For the processing of multiple successive rate control requests, according to the UP protocols of 3G standard, when the system receives multiple rate control request frames successively, the final rate control will be adopted. Thus, in this solution, only the first rate request will be processed normally, the next rate control request may be dropped. As a result, it is possible that the frame number in the response frame received by the rate control sender does not match with the frame number in the finally transmitted rate control frame, resulting in the failure of the final rate control.

This solution can process only the procedure control after the receipt of an UP control request, it does not support the origination of UP initialization, UP time alignment and UP rate control. According to the UP protocols of 3G standard, both of a RNC and a NGW may be not only an originator but also a handler of the UP control operations. When the RNC and MGW are the handlers of the UP control operation, it is impossible to implement the UP procedure control.

This solution supports only the procedure control processing under SMpSDU support mode. As the UP checking and distributing module does not differentiate the support modes when the UP frames are received, It is necessary to modify the software considerately when two versions of UP support modes need to be supported simultaneously.

SUMMARY OF THE INVENTION

The present invention provides a method, apparatus and system for implementing IuUP/NbUP procedure control function. The method according to an embodiment of the present invention includes:

parsing a received UP frame; generating a control message based on a value obtained from the parsing, and buffering the control message; and executing the buffered control message.

According to the embodiments of the present invention, a method for implementing IuUP/NbUP procedure control includes:

parsing a received rate control request frame; generating a rate control message based on a rate value obtained from the parsing, and buffering the rate control message; adjusting a rate by use of the buffered rate control message.

According to the embodiments of the present invention, a method for implementing IuUP/NbUP procedure control includes:

sending, by a first system, an UP frame to a second system when the first system gets an origination command;

parsing, by the second system, the received UP frame, generating a control message based on a value obtained from the parsing, and buffering the control message, executing the buffered control message, and returning a response frame to the first system after executing the control message.

According to the embodiments of the present invention, an apparatus for implementing IuUP/NbUP procedure control includes:

an UP rate control request processing module or an UP time alignment request processing module for parsing a received UP frame and generating a control message based on a value obtained from the parsing and buffering the control message into a message queue processing module;

the message queue processing module for buffering the control message and sending the control message to a procedure control execution module;

the procedure control execution module for executing the buffered control message.

According to the embodiments of the present invention, an apparatus for implementing IuUP/NbUP procedure control includes:

an UP rate control request processing module for parsing a received rate control request frame and generating a rate control message based on a rate value obtained from the parsing and buffering the rate control message into a message queue processing module;

the message queue processing module for buffering the rate control message and sending the rate control message to a procedure control execution module;

the procedure control execution module for adjusting a rate by use of the buffered rate control message.

According to the embodiments of the present invention, a system for implementing IuUP/NbUP procedure control includes:

an UP initialization origination processing module, an UP time alignment origination processing module and an UP rate control origination processing module in a first system, for send an UP frame to a second system when the first system gets an origination command;

an IuUP/NBUP procedure control device in the second system for parsing the received UP frame, generating a control message based on a value obtained from the parsing, and buffering the control message, executing the buffered control message, and returning a response frame to the first system after executing the control message.

It can be seen that: (1) the method and system of the present invention possess relatively good extensibility because the coexistence of multiple UP support modes has been taken into account and the software architecture does not need a significant modification; (2) by way of buffering multiple UP frames on receiving multiple UP frames, it can be ensured that all the procedure modules are kept independent with each other and are not restricted by each other, which solves the problem of being suspended by each other; (3) the origination operation and processing operation of UP procedure control may be supported simultaneously; (4) the repeated and successive rate control requests may be handled properly, and optimization may be implemented when the rate controls are originated successively, thus reducing the number of unnecessary rate control frames between the devices and avoiding repeated rate adjustment when the requirements of rate control are the same.

DETAILED DESCRIPTION OF THE PREFERRED EMBODIMENTS

Figure 1:
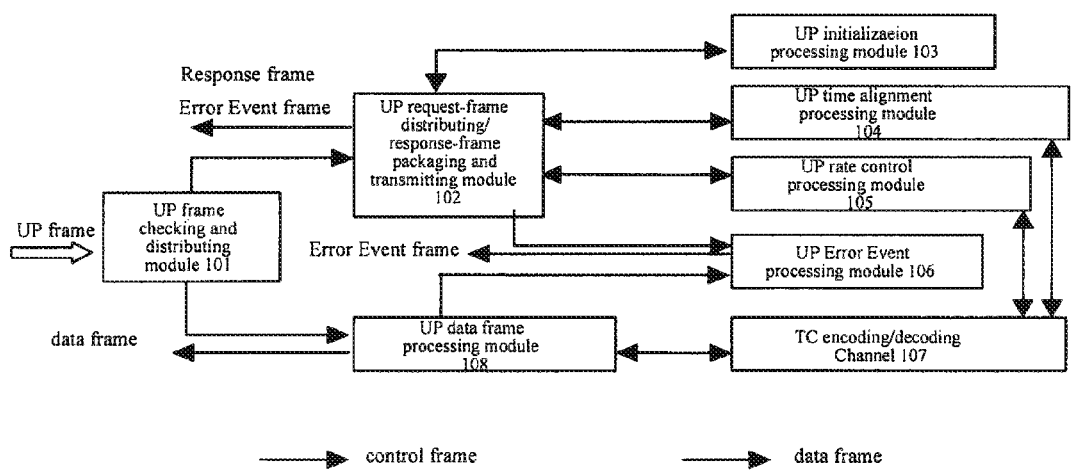
FIG. 1 is a structural diagram illustrating the IuUP/NbUP procedure control function according to the prior art.
Figure 2:
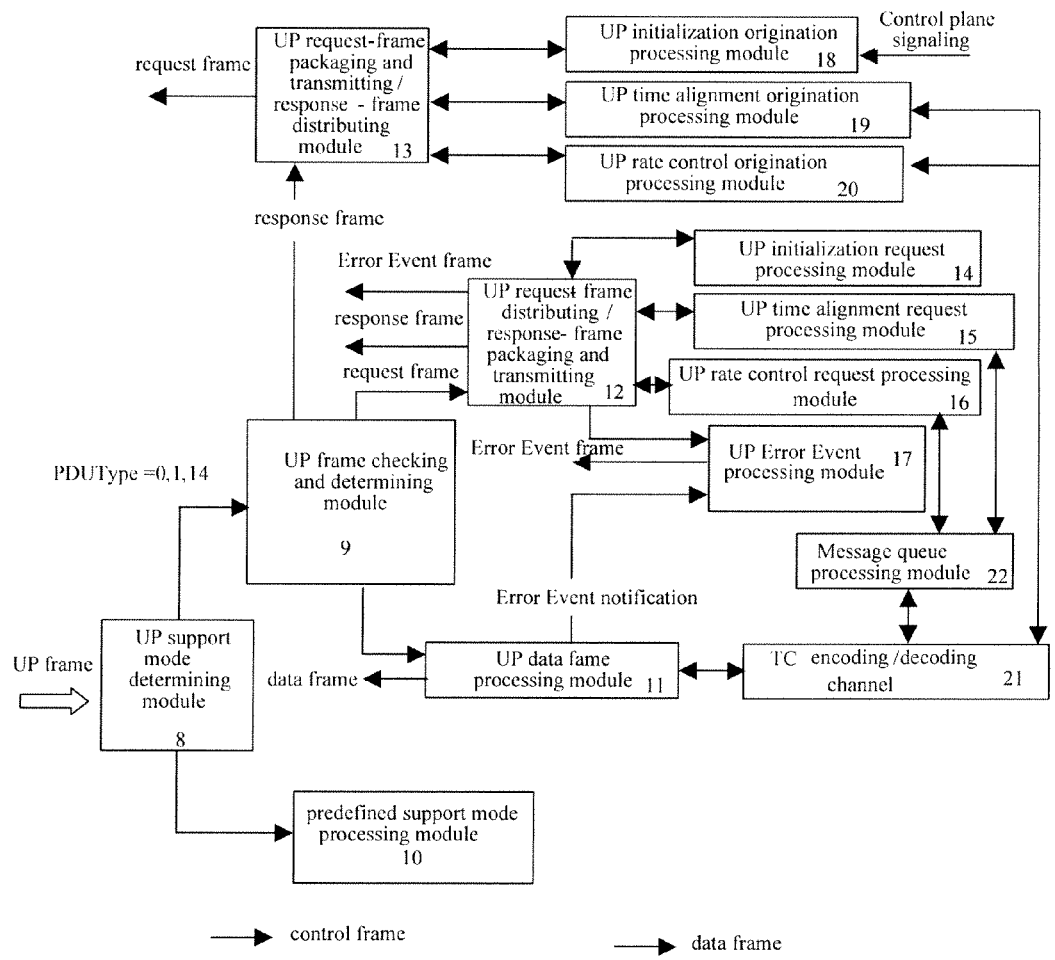
FIG. 2 is a structural diagram illustrating the IuUP/NbUP procedure control function according to an embodiment of the present invention.

As shown in FIG. 2, a system for implementing IuUP/NbUP procedure control function includes an UP request-frame distributing/response-frame packaging and transmitting module 12 under Support mode for predefined Service Data Unit size (SMpSDU), an UP data frame processing module 11, an UP initialization request processing module 14, an UP time alignment request processing module 15, an UP rate control request processing module 16, an UP error event processing module 17 and a TC encoding/decoding channel 21. Wherein, the control message is executed by the procedure control execution module in the embodiment of the present invention, the procedure control execution module may be implemented in a variety of manners. In an embodiment of the present invention, the procedure control execution module is the TC encoding/decoding channel 21.

The System May Also Include:

A message queue processing module 22, for buffering the control messages from the UP time alignment request processing module and the UP rate control request processing module;

An UP support mode determining module 8 for determining the support mode of an UP frame;

A predefined support mode processing module 10 for processing an UP frame of a predefined support mode;

An UP frame checking and determining module 9 for determining whether a received UP frame is a request frame or a response frame;

An UP initialization origination processing module 18 for processing an initialization operation originated by control plane signaling;

An UP time alignment origination processing module 19 for processing a time alignment control operation originated by the procedure control function executing entity;

An UP rate control origination processing module 20 for processing a rate adjustment control operation originated by the procedure control function executing entity;

An UP request-frame packaging and transmitting/response-frame distributing module 13 for distributing a response frame to the UP initialization origination processing module 18, the UP time alignment origination processing module 19 or the UP rate control origination processing module 20 based on the type of the response frame, and packaging and transmitting a request frame originated by the procedure control function executing entity.

A preferred embodiment of the present invention is given below. As shown in FIG. 2, when the system receives an UP frame, the UP support mode determining module 8 determines the type of the UP support mode based on the PDU-Type value in the UP frame header first. At present, the UP protocols of 3G standard defines only the SMpSDU support mode, but different manufacturers may have different support modes. Each support modes corresponds to a module for processing that UP support mode. The support modes is determined, the UP frame may be processed by the corresponding processing module.

If it is determine that the support mode is not SMpSDU, the UP frame may be sent to the predefined support mode processing module 10. If it is determine that the support mode is SMpSDU, the UP frame may be sent to the UP frame checking and determining module 9. The UP frame checking and determining module further checks the frame number of the UP frame, performs the CRC check and determines the type of the UP frame according to the value of PDUType of the UP frame. If the value of PDUType is 0 and 1, the UP frame is a date frame, and will be sent to the data frame processing module 11. If the value of PDUType is 14, the UP frame is a control frame; then it may be determined whether the UP frame is a request frame or a response frame based on the Ack/Nack field in the frame header (Please refer to 3GPP TS 25.415 for the specific UP control frame structure). If the UP frame is a request frame, it will be distributed to the UP request-frame distributing/response-frame packaging and transmitting module 12; otherwise, it will be distributed to the UP request-frame packaging and transmitting/response-frame distributing module 13.

On receiving a request frame, the UP request-frame distributing/response-frame packaging and transmitting module 12 determines the control type of the request frame based on the Procedure Indicator field in the frame header, then distributes the request frame to the UP initialization request processing module 14 if it is determined that the request frame is an initialization frame, to the UP time alignment request processing module 15 if it is determined that the request frame is a time alignment request frame, to the UP rate control request processing module 16 and the UP error event processing module 17 if it is determined that the request frame is a rate control request frame.

On receiving a response frame, the UP request-frame packaging and transmitting/response-frame distributing module 13 determines the control type of the response frame based on the Procedure Indicator field in the frame header, and then distributes the response frame to the UP initialization origination processing module 18, the UP time alignment origination processing module 19 or the UP rate control origination processing module 20 according to the type of the response frame. Upon the triggering of the control plane signaling from a third party or the triggering of the encoding/decoding channel of the local end, the UP initialization origination processing module 18, the UP time alignment origination processing module 19 and the UP rate control origination processing module 20 will transmit control messages to the UP request-frame packaging and transmitting/response-frame distributing module 13, and the control messages will be packaged into the corresponding request frames uniformly and the request frames will be transmitted to the UP protocol entity of the opposite end.

The individual modules for processing the request frame will be described below.

An operation control block is set in each of the UP initialization request processing module 14, the UP time alignment request processing module 15, the UP rate control request processing module 16 and the UP error event processing module 17 for saving the information such as the frame number of the request frame, the operation state and the like. When these request processing modules transmit a response frame to an entity of the opposite end, the frame number of the corresponding request frame will be filled back in the response frame, which can ensure the control originator to match the request frame and the response frame properly.

On receiving an initialization frame, the UP initialization request processing module 14 will extract a set of RFCIs (including the bearer sub-flow SDU size corresponding to each RFCI in the set of RFCIs) supported by the control originator, and thereafter will control the UP dada frame processing module 11 according to the set of RFCIs to transmit and receive the UP data streams.

On receiving a time alignment request frame of the control originator, the UP time alignment request processing module 15 will extract the time alignment value, and transmit a time control message to the TC encoding/decoding channel 21, indicating the TC encoding/decoding channel 21 to advance or postpone the transmitting time of the UP data frame processing module 11 by an designated value of time. The time control message is buffered in a FIFO (First In First Out) message queue processing module 22 before being transmitted to the TC encoding/decoding channel 21, and the message queue processing module 22 extracts the queue-header message and transmits it to the TC encoding/decoding channel 21. If the operation of TC encoding/decoding channel 21 is time-out, the queue-header message will be deleted and the next time control message in the queue will be processed. If a response message from the TC encoding/decoding channel 21 is received, the queue-header message will be deleted from the queue, and the response message of successful time alignment will be returned to the UP time alignment request processing module 15, and will be transmitted to the control originator by the UP time alignment request processing module 15.

On receiving a rate control request frame from the control originator, the UP rate control request processing module 16 will extract the maximal rate that the control originator demands, and transmit a rate control message to the TC encoding/decoding channel 21, indicating the TC encoding/decoding channel 21 to adjust the transmitting rate of the UP data frame processing module 11 to the designated value. Similarly the rate control message needs to be buffered in the FIFO message queue processing module 22 before being transmitted to the TC encoding/decoding channel 21. The message queue processing module 22 extracts the queue-header message and transmits it to the TC encoding/decoding channel 21. If the operation of TC encoding/decoding channel 21 is time-out, the queue-header message will be deleted and the next rate control message in the queue will be processed. When the response message from the TC encoding/decoding channel 21 is received, the queue-header message will be deleted from the queue, and the response message of successful rate control will be returned to the UP rate control request processing module 16, and will be transmitted to the control originator by the UP rate control request processing module 16.

The time control message and the rate control message transmitted from the UP time alignment request processing module 15 and the UP rate control request processing module 16 to the TC encoding/decoding channel 21 may share the same message queue processing module 22, or may use the separate message queue processing modules in their corresponding request processing modules. When sharing the same message queue processing module 22, the same message queue processing module 22 will process the control messages in a FIFO sequence, which ensures that one control operation will not be forced to be suspended or dropped due to the execution of the other control operations. When employing the separate message queues in their corresponding request processing modules, the system needs to check the states of the other request operations when it executes one control request operation. If the other operations are being executed, the current operation will be buffered in its message queue and will be executed when the other processing modules become idle.

Similarly, the UP time alignment request processing module 15 and the UP rate control request processing module 16 may share one execution entity, e.g., TC encoding/decoding channel 21, to execute the control request operations. Alternatively, the processing modules related with data-stream processing can be used as execution entities of different control request operations. For example, the TC encoding/decoding channel 21 can be used for executing rate adjustment operation, and the UP data-frame processing module 11 can be used for executing time alignment operation.

Figure 3:
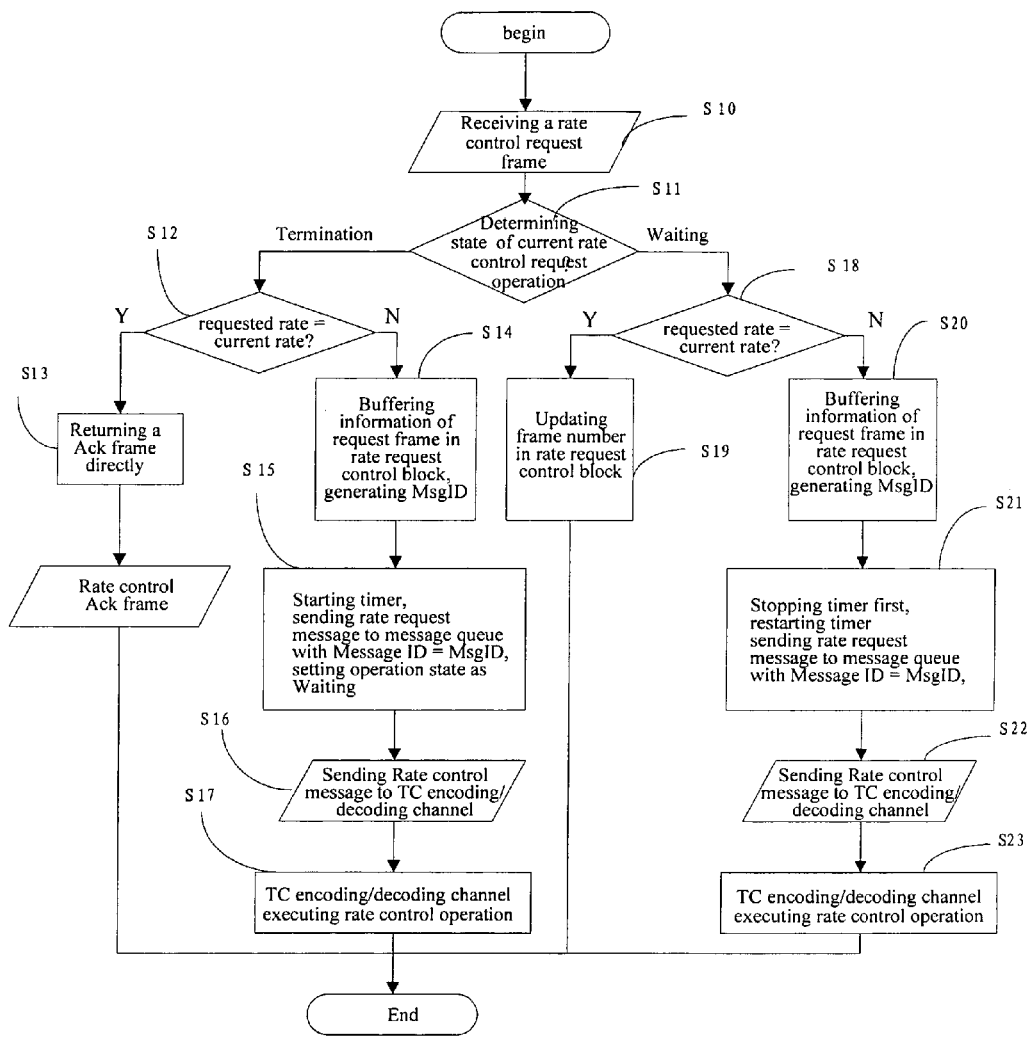
FIG. 3 is a flow chart for processing a rate control request frame according to an embodiment of the present invention.

Hereinafter the procedure that the UP rate control request processing module 16 processes the rate control request frames will be further described. As shown in FIG. 3, the operation control block of the UP rate control request processing module 16 only saves the information of the latest rate control request including the rate, operation state (Waiting or Termination), frame number of the request frame. On receiving the rate control request frame from the control originator (step S10), firstly, it checks whether the latest operation state buffered in its operation control block is Waiting or Termination (step S11).

If the state is Termination, it judges whether the rate of this rate control request is equal to the currently buffered rate (step S12), and if yes, an ACK Frame will be directly returned to the control originator (step S13), that is, a success response will be directly replied to the control originator, thereby avoiding meaningless control operations to the TC encoding/decoding channel and hence improving the response efficiency of the system. If the rate of this rate control request is not equal to the currently buffered rate, the information of the rate control request frame will be buffered in the operation control block and an MsgID will be generated (step S14), then a waiting timer is started, and a rate control message is transmitted to the message queue processing module 22 with the message ID=MsgID, and the state of its operation control block is set as Waiting (step S15). Then the message queue processing module 22 transmits the rate control message to the TC encoding/decoding channel (step S16). The TC encoding/decoding channel executes the rate control request operation (step S17).

If the state is Waiting, it is also necessary to determine whether the rate of this rate control request is equal to the currently buffered rate (step S18), and if yes, the frame number of the request frame in the operation control block is updated as the frame number of the current rate control request frame (step S19); and if not, the information of the rate control request frame is buffered in the operation control block and a new MsgID is generated (step S20). Then the waiting timer is stopped first, and is restarted again, and this rate control message is sent to the message queue processing module 22 with the message ID=MsgID (step S21). Then the message queue processing module 22 transmits the rate control message to the TC encoding/decoding channel 21 (step S22), and the TC encoding/decoding channel 21 executes the rate control operation (step S23). The procedure of the TC encoding/decoding channel 21 returning a rate control response message and the procedure of the processing of the UP rate control request processing module 16 will be described below.

Figure 4:
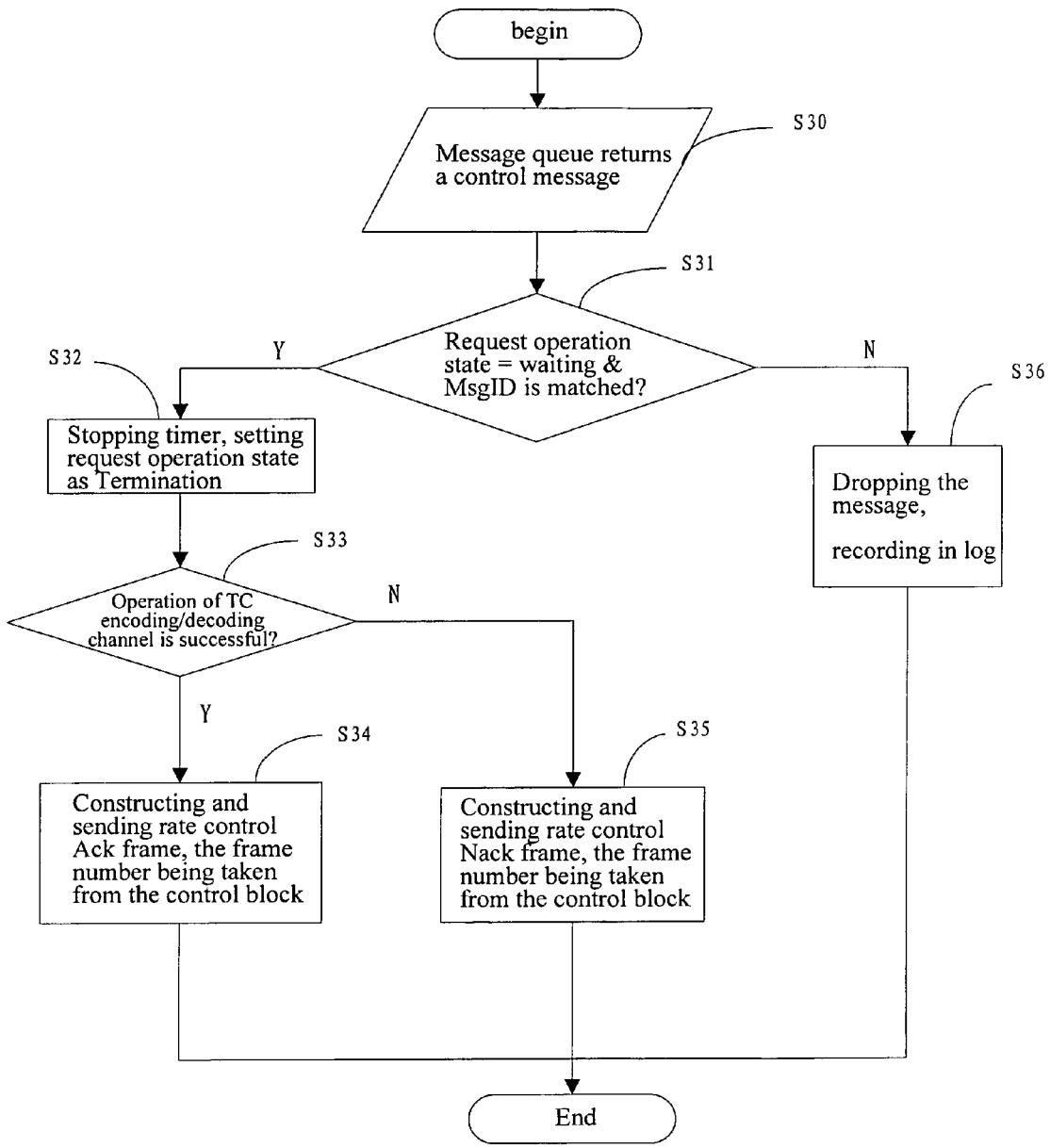
FIG. 4 is a flow chart illustrating the TC encoding/decoding channel returning the rate control response message according to an embodiment of the present invention.

As shown in FIG. 4, when the TC encoding/decoding channel 21 returns the previous rate control response message to the message queue processing module 22, the message queue processing module 22 will return the rate control response message to the operation control block of the UP rate control request processing module 16 and delete the queue-header message (step S30).

On receiving the rate control response message, the UP rate control request processing module 16 judges whether the state of its operation control block is Waiting, and whether the MsgID of this response message matches with that saved in the operation control block (step S31). If the state is Waiting and it matches, the waiting timer is stopped, and the state of the operation control block is set as Termination (step S22). Then it is determined, by use of the rate control response message, whether the operation of the TC encoding/decoding channel is successful (step S33), and if yes, a rate control Ack Frame is constructed and transmitted, in which the frame number of the AcK frame is that saved in the operation control block (step 34). If it is not successful, a rate control Nack Frame is constructed and transmitted, in which the frame number of the NacK frame is that saved in the operation control block (step S35). If the state is not Waiting or it does not match, the rate control response frame is dropped, which is recorded in log (step S36). In this way, the MsgID will not be matched until the TC encoding/decoding channel 21 returns the last rate control response frame. At this time, the UP rate control request processing module 16 returns a response frame to the control originator according to the frame number of the latest rate control request frame, thus ensuring the properness of the successive rate control processing, so that the later rate control request frame will not be answered until the earlier rate control request frames are dropped.

If an error is found when processing the UP data frame or the UP control frame, the UP error event processing module 17 will be informed. After determining the error type, the UP error event processing module 17 will transmit an error event frame to the entity of the opposite end. As for the error event frame transmitted from the opposite end, the local end will record the event and inform the data-stream processing function entity to handle accordingly.

As can be seen from FIG. 2 that the present invention also supports the control origination of the UP control operation. UP initialization is driven by the control plane signaling, and in general, UP initialization is originated when the call establishes a link. Rate control and time alignment are control operations originated by the UP data frame processing module 11 according to the requirements for processing the UP Data-streams, or may be originated by the TC encoding/decoding channel. When a TFO (Tandem Free Operation) connection is established between a 3G MGW and a GSM central office, the core network will originate rate control to the RAN (Radio Access Network), which is generally undertaken by the TC encoding/decoding channel 21 on MGW during the TFO negotiation. Hereinafter an example of the TC encoding/decoding channel 21 originating a control operation will be described.

An origination operation control block is set in each of the UP initialization origination processing module 18, the UP time alignment origination processing module 19 and the UP rate control origination processing module 20 for saving the information such as a duplicate of a transmitting frame, operation state and the retransmission counter. If the entity of the opposite end has no response, the entity of the local end will retransmit the buffered duplicate of the control frame and begin to count. When the count exceeds a designated number of times (e.g. it can be set 3 times by the system), the current operation will be terminated. The operation state is Waiting when waiting for the response frame, while the operation state is Idle when the response frame of the opposite end is received or retransmission times exceeds the designated number of times.

Figure 5:
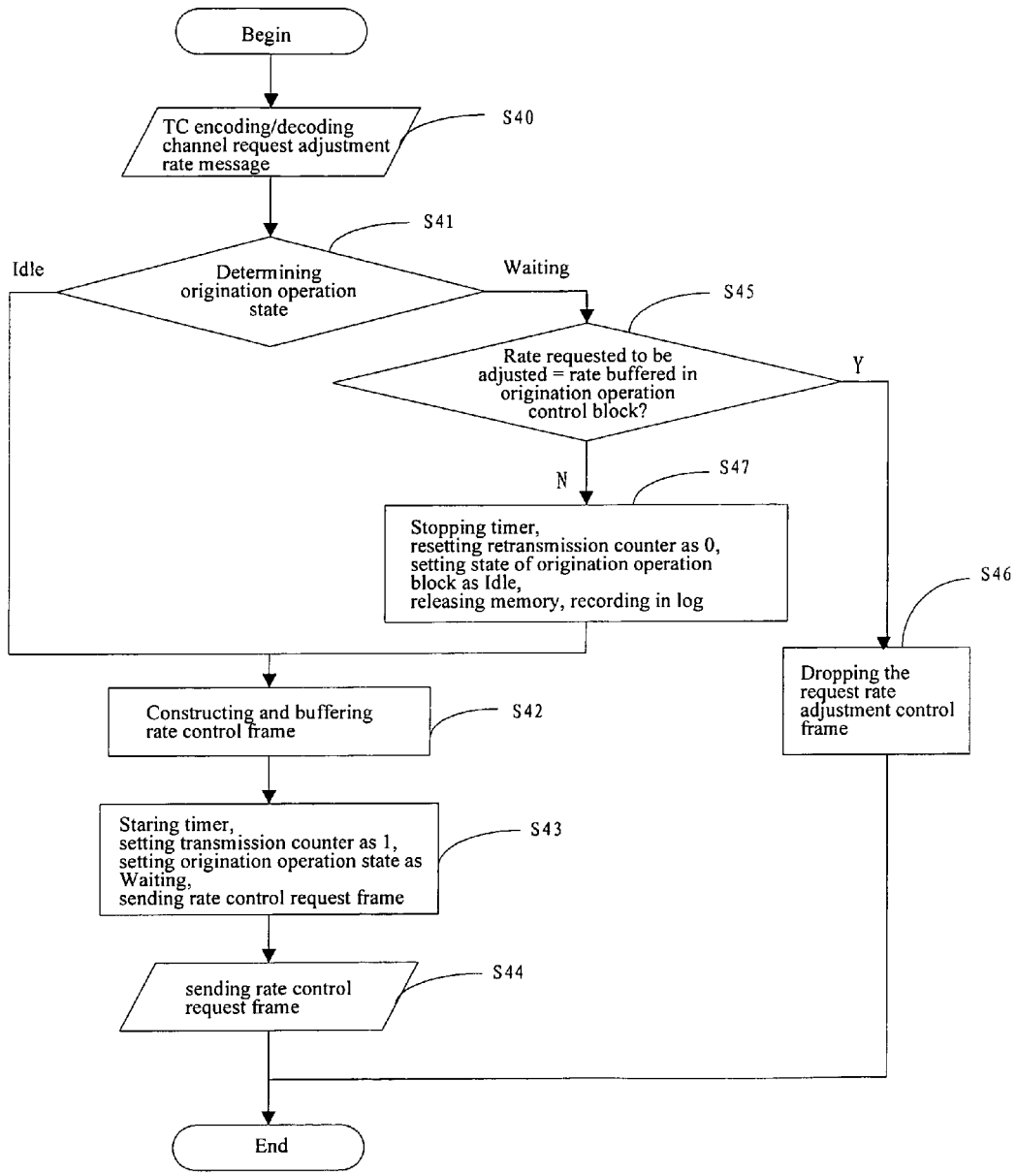
FIG. 5 is a flow chart illustrating the TC encoding/decoding channel originating a rate adjustment request control message according to an embodiment of the present invention.

As shown in FIG. 5, after the TC encoding/decoding channel 21 transmits a rate adjustment request message to the UP rate control origination processing module 20 (step S40). The UP rate control origination processing module 20 checks the state of the origination operation saved in its origination operation control block firstly (step S41). If the state is Idle, the UP rate control origination processing module 20 constructs and buffer the rate control request frame (step S42), and the waiting timer is started, the transmission counter is increased by 1 and the state of the origination operation is set as Waiting (step S43), then the rate control request frame is transmitted (step S44). If the state of the origination operation is Waiting, the UP rate control origination processing module 20 judges whether the request adjustment rate required by the TC encoding/decoding channel 21 is equal to the request adjustment rate buffered in its origination operation control block (step S45), and if yes, the rate adjustment request message of the TC encoding/decoding channel 21 will be dropped (step S46); and if not, the waiting timer is stopped, the retransmission counter is reset to 0, the operation state is set as Idle, the memory for buffering the rate control request frame is released, which is recorded in log (step S47). Then the process returned to step S42, the rate control request frame is constructed and buffered again (step S42), the waiting timer is restarted, and the retransmission counter is reset to 1 (step S43), the rate control request frame is retransmitted (step S44).

Figure 6:
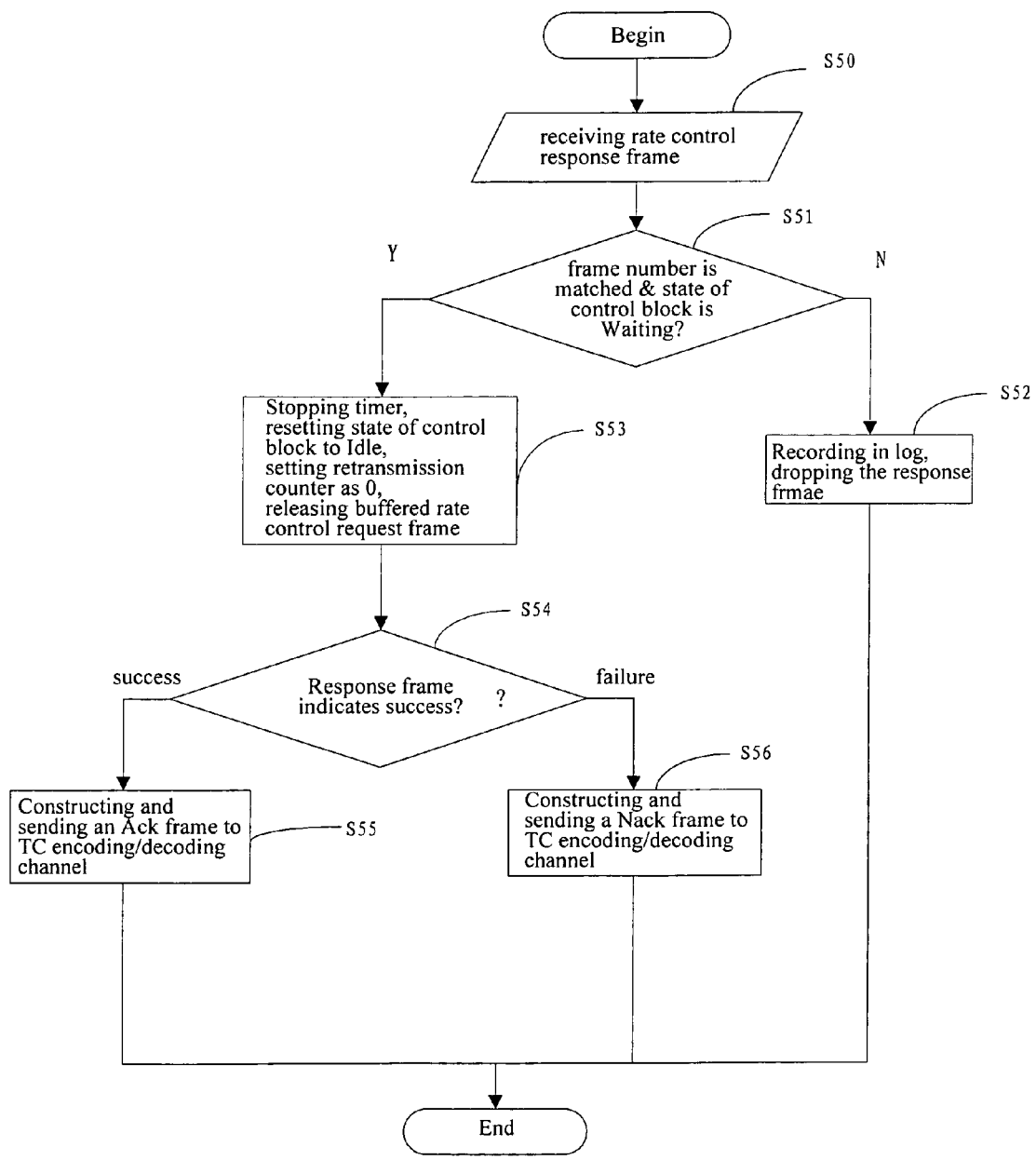
FIG. 6 is a flow chart illustrating process on the reception of the rate control response frame according to an embodiment of the present invention.

Then as shown in FIG. 6, on receiving the earliest rate control response frame (step S50), firstly, the UP rate control origination processing module 20 checks whether the frame number matches with the frame number saved in the origination operation control block, and whether the operation state is Waiting (step S51). If the frame number does not match or the operation state is not Waiting, the rate control response frame will be dropped, which is recorded in log (step S52). If the frame number matches and the operation state is Waiting, the waiting timer will be stopped, the state of the origination operation control block will be set as Idle, the retransmission counter will be set to 0, and the memory for buffering the rate control request frame will be released (step S53). Then the UP rate control origination processing module 20 determines whether the entity of the opposite end is successful according to the response frame (step S54), and if yes, the UP rate control origination processing module 20 constructs a rate control ACK Frame and transmits it to the TC encoding/decoding channel 21 (step S55); otherwise, the UP rate control origination processing module 20 constructs a rate control Nack Frame and transmits it to the TC encoding/decoding channel 21 (step S56).

What is claimed is:

1. A method for implementing IuUP/NbUP procedure control, comprising:

parsing a received User Plane (UP) frame;

if the UP frame is a rate control request frame, generating a rate control message based on a rate value obtained from the parsing, and if the UP frame is a time control request frame, generating a time control message based on a time value obtained from the parsing;

buffering the generated rate control message and the time control message into a same message queue; or buffering the generated rate control message and time control message into different message queues respectively; and executing the messages in the message queue in a time order.

2. A method for implementing IuUP/NbUP procedure control, comprising:

parsing a received rate control request frame;

generating a rate control message based on a rate value obtained from the parsing;

generating and adding, by a User Plane (UP) rate control request processing module, a message identification into the rate control message, and saving the latest generated message identification and a frame number latest obtained from the parsing;

buffering the generated rate control message into a message queue processing module;

sending, by the message queue processing module, the buffered message to a procedure control execution module for rate adjustment;

returning, by the message queue processing module, a rate control response message containing the message identification to the UP rate control request processing module;

when the UP rate control request processing module receives a rate control response message with a message identification, which is the same as the saved message identification, returning a rate control response frame to an originator sending the rate control request frame.

3. The method according to claim 2, further comprising:
saving, by the UP rate control request processing module, the rate value latest obtained from parsing the rate control request frame, and saving a current operation state;
after the rate value of the rate control request frame is parsed out and before the rate control message is generated, when the UP rate control request processing module determines whether the current operation state is Waiting or Termination and the rate value obtained from parsing is not equal to the latest saved rate value, executing the following operation:
if the current operation state is Termination, updating the current operation state as Waiting, executing the process of generating and buffering the rate control message;
if the current operation state is Waiting, executing the process of generating and buffering the rate control message;
wherein the generating and buffering the rate control message includes:
generating and adding a message identification into the rate control message, saving a latest generated message identification, sending the rate control message containing the rate value obtained from parsing and the latest generated message identification to the message queue processing module.

4. The method according to claim 3, further comprising:
if the current operation state is Termination, and the rate value obtained from parsing is equal to the latest saved rate value, returning the rate control response frame;
if the current operation state is Waiting, and the rate value obtained from parsing is equal to the latest saved rate value, updating the saved frame number.

5. The method according to claim 2, wherein before returning a rate control response frame, the method further comprises:
determining whether the rate control message is executed successfully by use of the rate control response message;
if it is executed successfully, returning the rate control response frame indicating the success,
if it is executed unsuccessfully, returning the rate control response frame indicating the failure.

6. A method for implementing IuUP/NbUP procedure control, comprising:
sending, by a first system, a User Plane (UP) frame to a second system when the first system gets an origination command;
parsing, by the second system, a control data unit type value of the UP frame, determining a support mode of the UP frame by use of protocol data unit type value, executing an operation corresponding to the support mode for the UP frame;
parsing, by the second system, the received UP frame, generating a control message based on a value obtained from the parsing, and buffering the control message, executing the buffered control message, and returning a response frame to the first system after executing the control message.

7. The method according to claim 6, wherein after the UP frame is determined to be a support mode for a predefined Service Data Unit size, the second system determines whether the UP frame is a request frame or a response frame according to the protocol data unit type value;
if the UP frame is a request frame, the UP frame is parsed and a control request message is generated.

8. The method according to claim 6, wherein sending an UP frame to the second system comprises:
when the first system sends an UP frame, saving, by the first system, a duplicate of the sent UP frame, setting a current operation state, recording a number of times of retransmission;
wherein, after sending the UP frame, the method further comprises:
setting the current operation state as Waiting, starting a waiting timer, and if a response frame is not received from the second system within a predefined time, retransmitting the UP frame by use of the saved duplicate and recording the number of times of retransmission;
stopping the current transmission when the number of times of retransmission exceeds a predefined value.

9. The method according to claim 8, wherein if the sent UP frame is a rate control request frame, sending the rate control request frame further comprises:
determining the current operation state;
if the current operation state is Idle, sending the rate control request frame.

10. The method according to claim 8, further comprising:
saving a rate value requested by the latest rate control request frame;
before sending the rate control request frame, if the current operation state is Waiting, determining whether rate value requested by the latest rate control request frame is equal to the latest saved rate value;
if it is not equal, stopping the waiting timer, re-recording the number of times of retransmission, setting the current operation state as Idle, and sending the rate control request frame;
if it is equal, stopping sending the rate control request frame.

11. The method according to claim 8, wherein after the first system receives a rate control response frame from the second system, the method further comprises:
after parsing out the frame number of the rate control response frame, determining whether it is equal to the frame number of the duplicate of frame saved by itself, and determining the current operation state;
if it is equal and the current operation state is Waiting, stopping the waiting timer, setting the current operation state as Idle, releasing the saved duplicate of rate control request frame, resetting the recorded number of times of retransmission to 0;
if it is not equal, dropping the rate control response frame.

12. The method according to claim 11, wherein if the frame number of the rate control response frame is equal to the frame number of the duplicate of frame saved by itself and the current operation state is Waiting, the method further-comprising:
determining whether the second system has a successful rate control operation by use of the rate control response frame;
if yes, sending a response message indicating the success to an originator generating the origination command;
if not, dropping the rate control response frame.

13. The method according to claim 6, wherein the sent UP frame is an initialization frame, a rate control request frame, or a time control request frame.

14. An apparatus for implementing IuUP/NbUP procedure control, comprising:
a User Plane (UP) rate control request processing module and an UP time alignment request processing module for parsing a received UP frame wherein:
the UP rate control request processing module is further adapted to generate a rate control message based on a rate value obtained from the parsing and buffering the rate control message into a message queue processing module;
the UP time alignment request processing module is further adapted to generate a time control message based on a time value obtained from the parsing and buffering the time control message into the message queue processing module;
the message queue processing module for buffering the rate control message and the time control message into a same message queue; or buffering the rate control message and the time control message into different message queues respectively and sending the control message to a procedure control execution module; and
the procedure control execution module for executing the messages in the message queue in a time order.

15. An apparatus for implementing IuUP/NbUP procedure control, comprising:
a User Plane (UP) rate control request processing module for parsing a received rate control request frame and generating a rate control message based on a rate value obtained from the parsing and buffering the rate control message into a message queue processing module, generating and adding a message identification into the rate control message, and saving a latest generated message identification and a frame number latest obtained from parsing, returning a rate control response frame to an originator sending the rate control request frame when receiving a rate control response message with a message identification, which is the same as the saved message identification, and buffering the rate control message with the added message identification into a message queue processing module;
the message queue processing module for buffering the rate control message and sending the rate control message to a procedure control execution module;
the procedure control execution module for adjusting a rate by use of the buffered rate control message, and returning a rate control response message containing the message identification to the UP rate control request processing module via the message queue processing module after the rate has been adjusted.

16. The apparatus according to claim 15, wherein the procedure control execution module is a Transcoder (TC) encoding/decoding channel.

17. The apparatus according to claim 16, wherein
the UP rate control request processing module is also adapted to save the rate value latest obtained from parsing the rate control request frame, and to save a current operation state;
after the rate value of the rate control request frame is parsed out and before the rate control message is generated, after determining whether the current operation state is Waiting or Termination and the rate value obtained from parsing is not equal to the latest saved rate value, the UP rate control request processing module executes the following operation:
if the current operation state is Termination, updating the current operation state as Waiting, executing the process of generating and buffering the rate control message;
if the current operation state is Waiting, executing the process of generating and buffering the rate control message;

wherein generating and buffering the rate control message includes:
generating and adding a message identification into the rate control message, saving the latest generated message identification, sending the rate control message containing the rate value obtained from parsing and the latest generated message identification to the message queue processing module.

18. The apparatus according to claim 17, wherein the UP rate control request processing module is also adapted to
return a rate control response frame, if the current operation state is Termination and the rate value obtained from parsing is equal to the latest saved rate value;
update the saved frame number, if the current operation state is Waiting and the rate value obtained from parsing is equal to the latest saved rate value.

19. The apparatus according to claim 16, wherein
the UP rate control request processing module is also adapted to determine whether the rate control message is executed successfully by use of the rate control response message before returning a rate control response message;
if it is executed successfully, the UP rate control request processing module returns a rate control response frame indicating the success,
if it is executed unsuccessfully, the UP rate control request processing module returns a rate control response frame indicating the failure.

20. A system for implementing IuUP/NbUP procedure control, comprising:
a User Plane (UP) initialization origination processing module, an UP time alignment origination processing module and an UP rate control origination processing module in a first system, for sending an UP frame to a second system when the first system gets an origination command;
an IuUP/NBUP procedure control device in the second system for parsing the received UP frame, generating a control message based on a value obtained from the parsing, and buffering the control message, executing the buffered control message, and returning a response frame to the first system after executing the control message;
a support mode determining module in the second system for parsing a protocol data unit type value of the UP frame, determining a support mode of the UP frame by use of the protocol data unit type value, and executing an operation corresponding to the support mode for the UP frame; and
wherein the second system further comprises a frame checking and determining module for determining whether the UP frame is a request frame or a response frame according to the protocol data unit type value after the support mode determining module determines that the UP frame is a support mode for a predefined Service Data Unit size;
wherein if the UP frame is a request frame, the UP frame is sent to the IuUP/NBUP procedure control device for parsing and a control request message is generated.

21. The system according to claim 20, wherein the UP initialization origination processing module, the UP time alignment origination processing module and the UP rate control origination processing module in the first system are also adapted to:
when sending an UP frame, save a duplicate of the sent UP frame, set a current operation state, and record a number of times of retransmission;

after sending the UP frame, set the current operation state as Waiting, start a waiting timer, and if a response frame is not received from the second system within a predefined time, retransmit the UP frame by use of the saved duplicate and record the number of times of retransmission;

stop the current transmission when the number of times of retransmission exceeds a predefined value.

22. The system according to claim 21, wherein the UP rate control origination processing module is also adapted to determine the current operation state before sending the rate control request frame, and if the current operation state is Idle, to send the rate control request frame.

23. The system according to claim 21, wherein the UP rate control origination processing module is also adapted to save a rate value requested by the latest rate control request frame; wherein:

before sending the rate control request frame, if the current operation state is Waiting, the UP rate control origination processing module determines whether rate value requested by the latest rate control request frame is equal to the latest saved rate value;

if it is not equal, stops the waiting timer, re-records the number of times of retransmission, sets the current operation state as Idle, and sends the rate control request frame;

if it is equal, stops sending the rate control request frame.

24. The system according to claim 21, wherein the UP rate control origination processing module is also adapted to after parsing out the frame number of the rate control response frame, determine whether it is equal to the frame number of the duplicate of frame saved by itself, and determine the current operation state;

if it is equal and the current operation state is Waiting, stop the waiting timer, set the current operation state as Idle, release the saved duplicate of rate control request frame, reset the recorded number of times of retransmission to 0;

if it is not equal, drop the rate control response frame.

* * * * *